United States Patent [19]

DeTorre

[11] 4,109,841

[45] Aug. 29, 1978

[54] APPARATUS FOR OPENING SCORE LINES IN GLASS SHEETS

[75] Inventor: Robert P. DeTorre, Pittsburgh, Pa.

[73] Assignee: PPG Industries, Inc., Pittsburgh, Pa.

[21] Appl. No.: 690,337

[22] Filed: May 26, 1976

[51] Int. Cl.² ............................................ C03B 33/02
[52] U.S. Cl. ...................................... 225/96.5; 225/2; 225/3; 225/97; 225/103
[58] Field of Search .................. 225/2, 3, 96.5, 103, 225/97; 65/97, 112, 176; 83/658

[56] References Cited

U.S. PATENT DOCUMENTS

| 245,149 | 8/1881 | Fowler | 83/658 X |
|---|---|---|---|
| 245,150 | 8/1881 | Fowler | 83/658 X |
| 1,997,402 | 4/1935 | Drake | 225/93 |
| 2,212,599 | 8/1940 | Hall | 225/104 |
| 2,504,655 | 4/1950 | Dallas | 225/96.5 |
| 3,137,425 | 6/1964 | Arnaud | 225/104 X |
| 3,181,757 | 5/1965 | O'Dell et al. | 225/96.5 |
| 3,216,635 | 11/1965 | Lefevre | 225/96.5 |
| 3,259,286 | 7/1966 | LeGras | 225/2 |
| 3,268,135 | 8/1966 | Smith | 225/2 |
| 3,439,849 | 4/1969 | Matsuzaki et al. | 225/96.5 |
| 3,592,370 | 7/1971 | Boardman | 225/2 |
| 3,744,690 | 7/1973 | Gray et al. | 225/96.5 X |
| 3,779,437 | 12/1973 | Yamamoto et al. | 225/96.5 |
| 3,800,991 | 4/1974 | Grove et al. | 225/2 |

*Primary Examiner*—Frank T. Yost
*Attorney, Agent, or Firm*—Donald Carl Lepiane

[57] ABSTRACT pg,1 Score lines or fracture lines in a glass sheet are opened by advancing the glass sheet along an article movement path into a snapping station with the score lines to be opened extending between the leading and trailing edge of the sheet as it moves along the article movement path. A moving bending moment is applied to the glass sheet along a path transverse to the article movement path. In one embodiment, the bending moment is applied to the glass sheet by a pair of spaced rotatably mounted wheels urging the sheet in a first direction as a rotatably mounted wheel urges the sheet in a second opposite direction.

20 Claims, 19 Drawing Figures

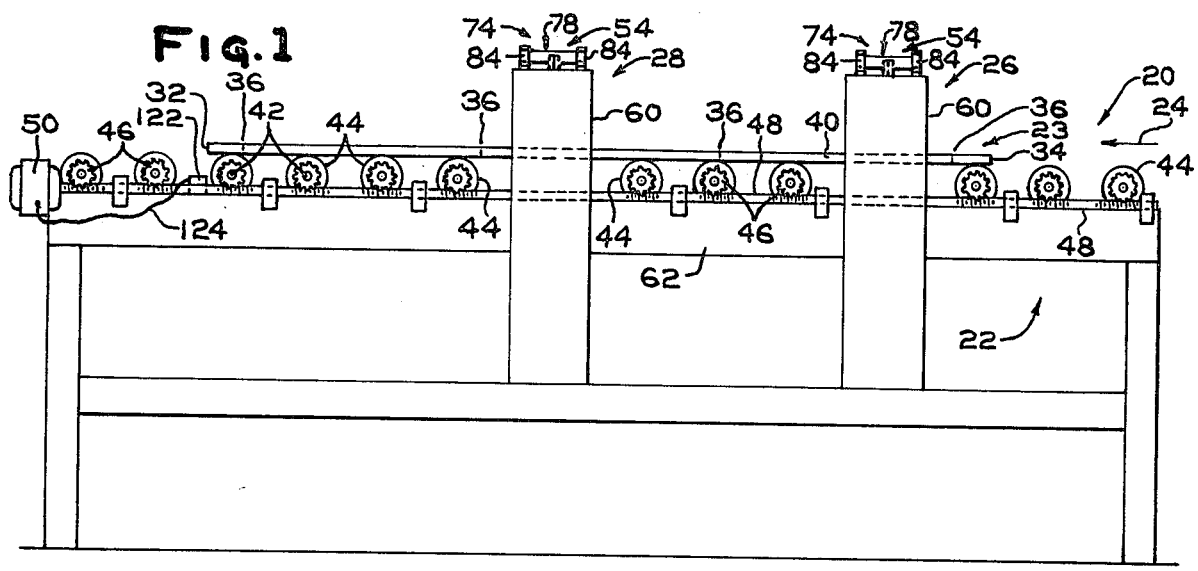
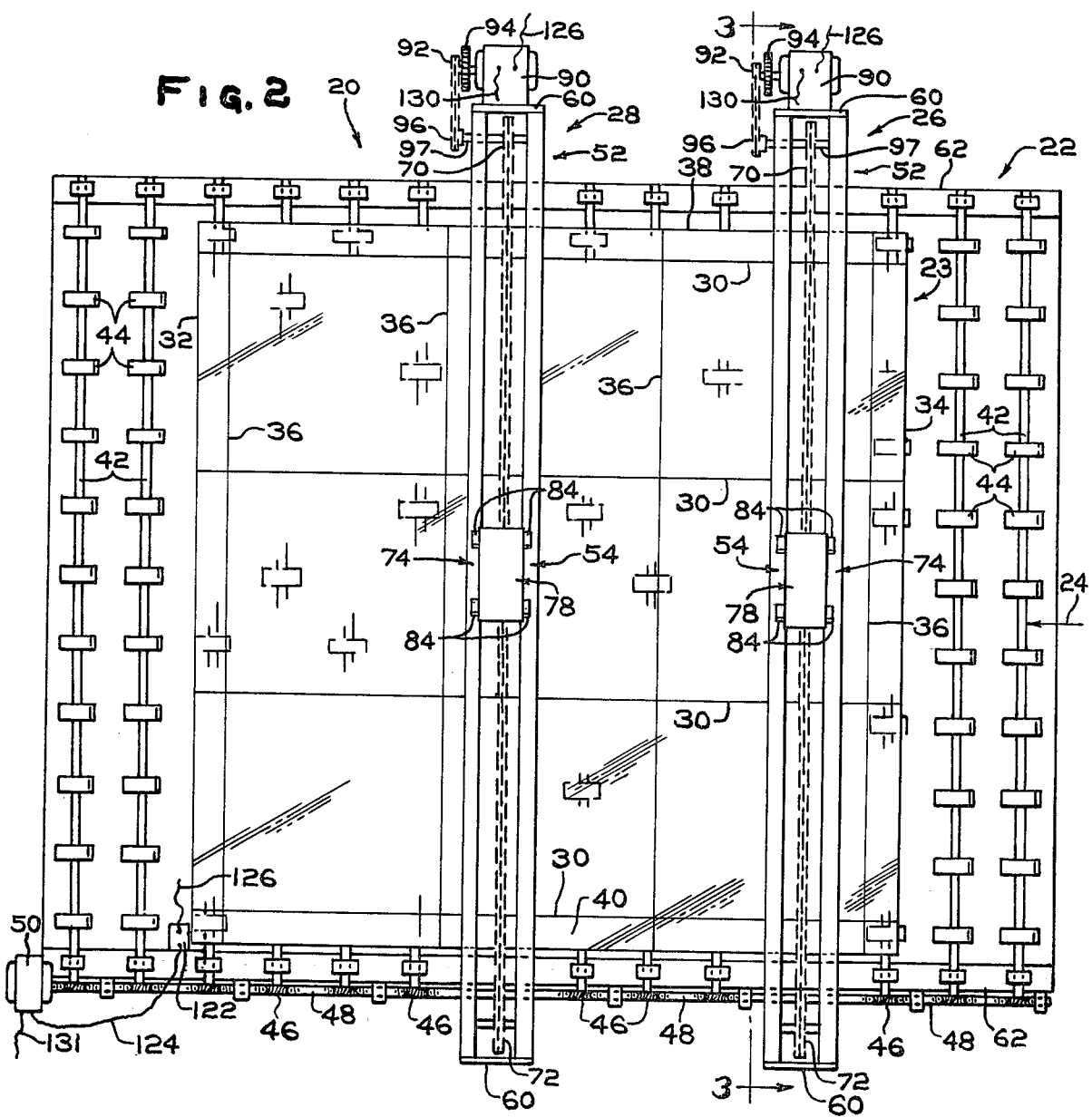

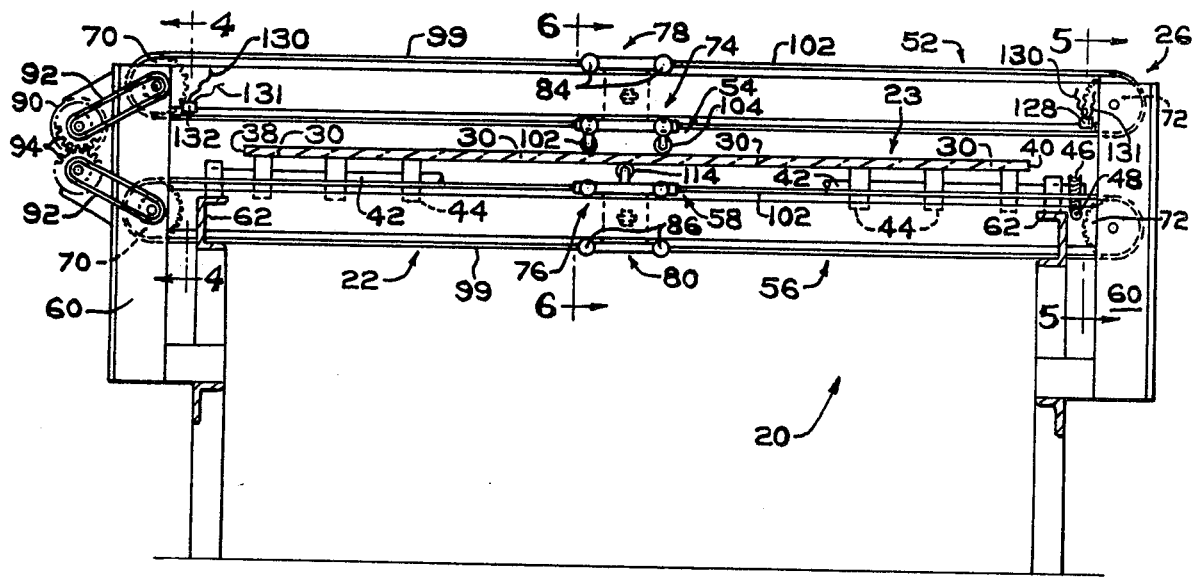
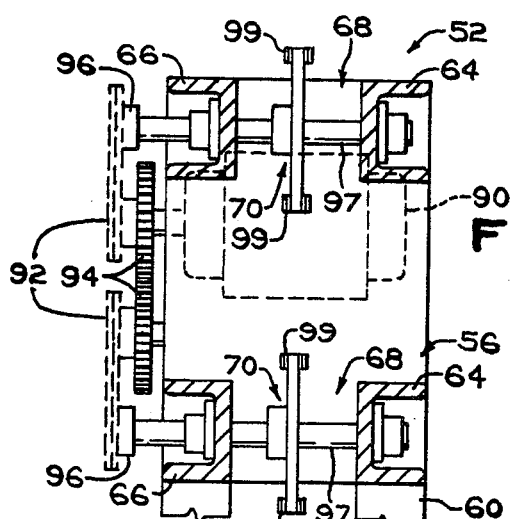
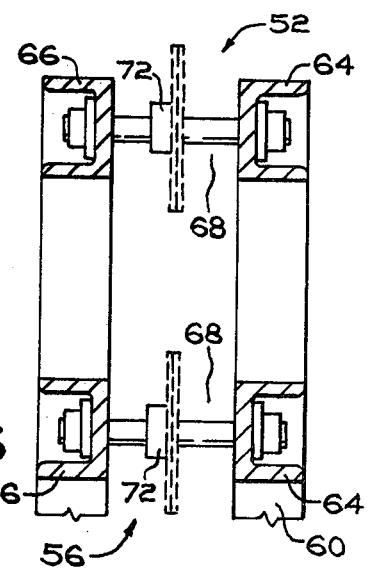
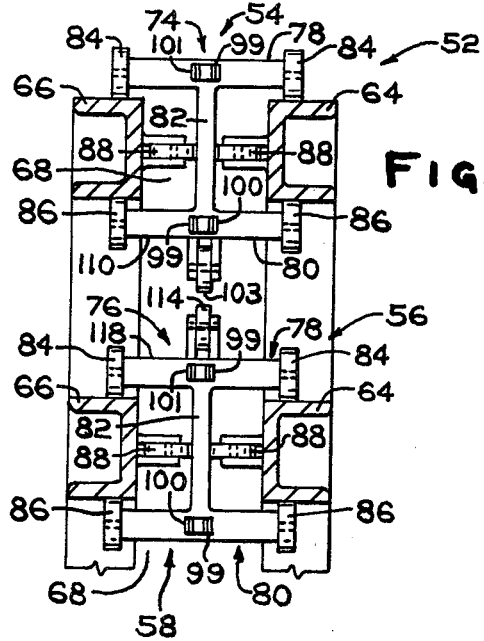
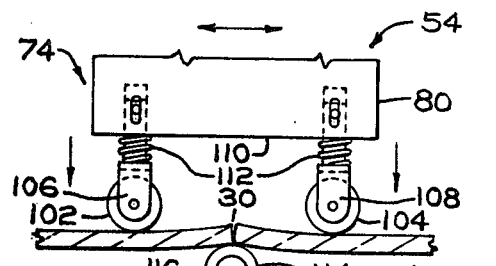

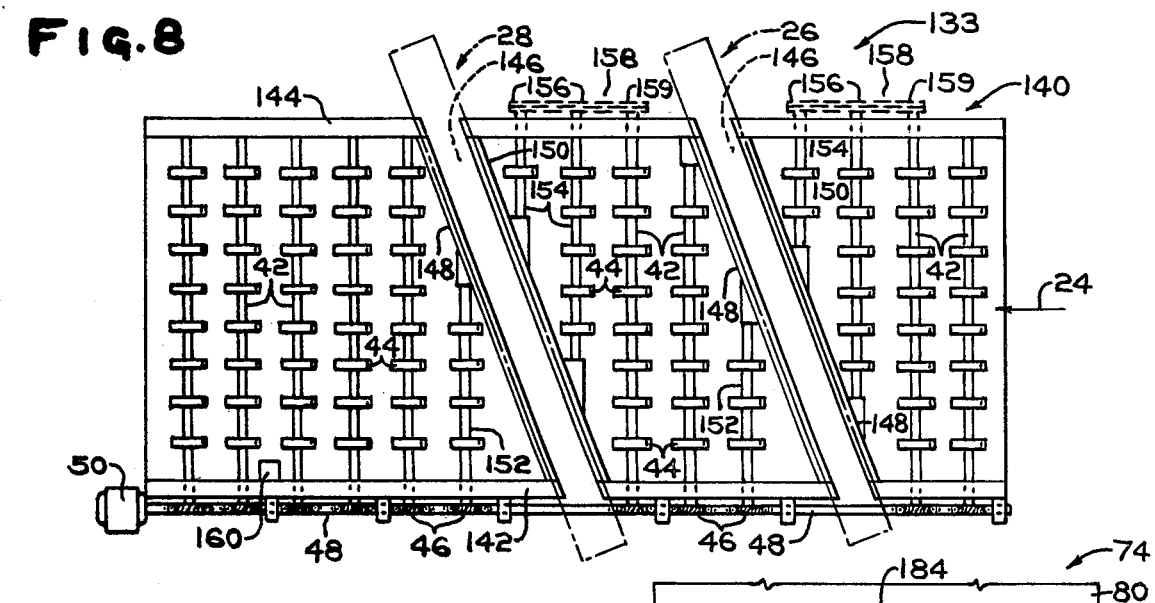
Fig. 8
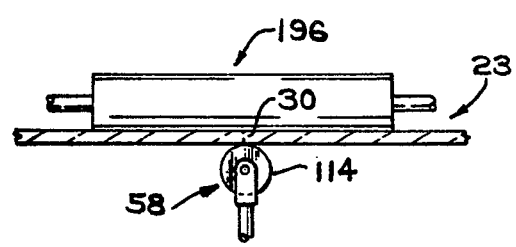
Fig. 11
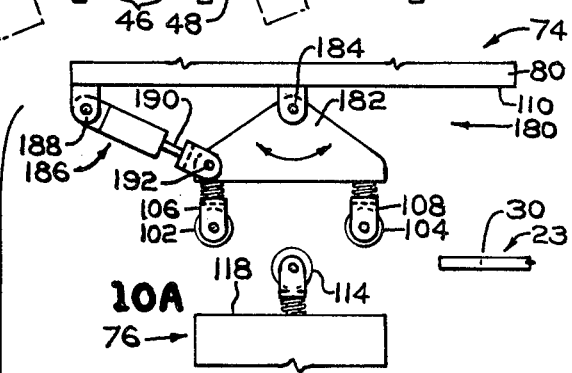
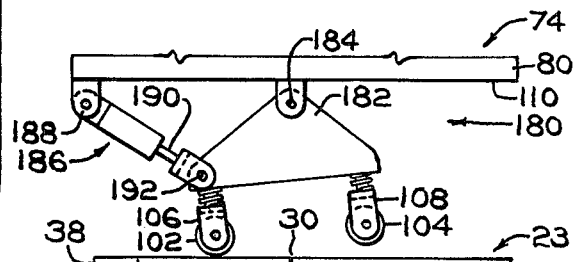
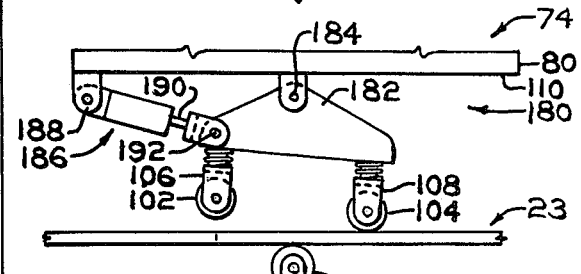
Fig. 10
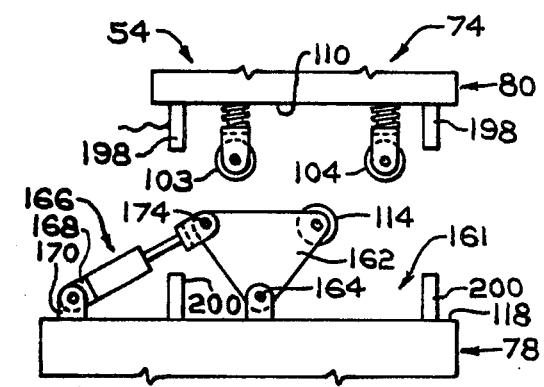
Fig. 9

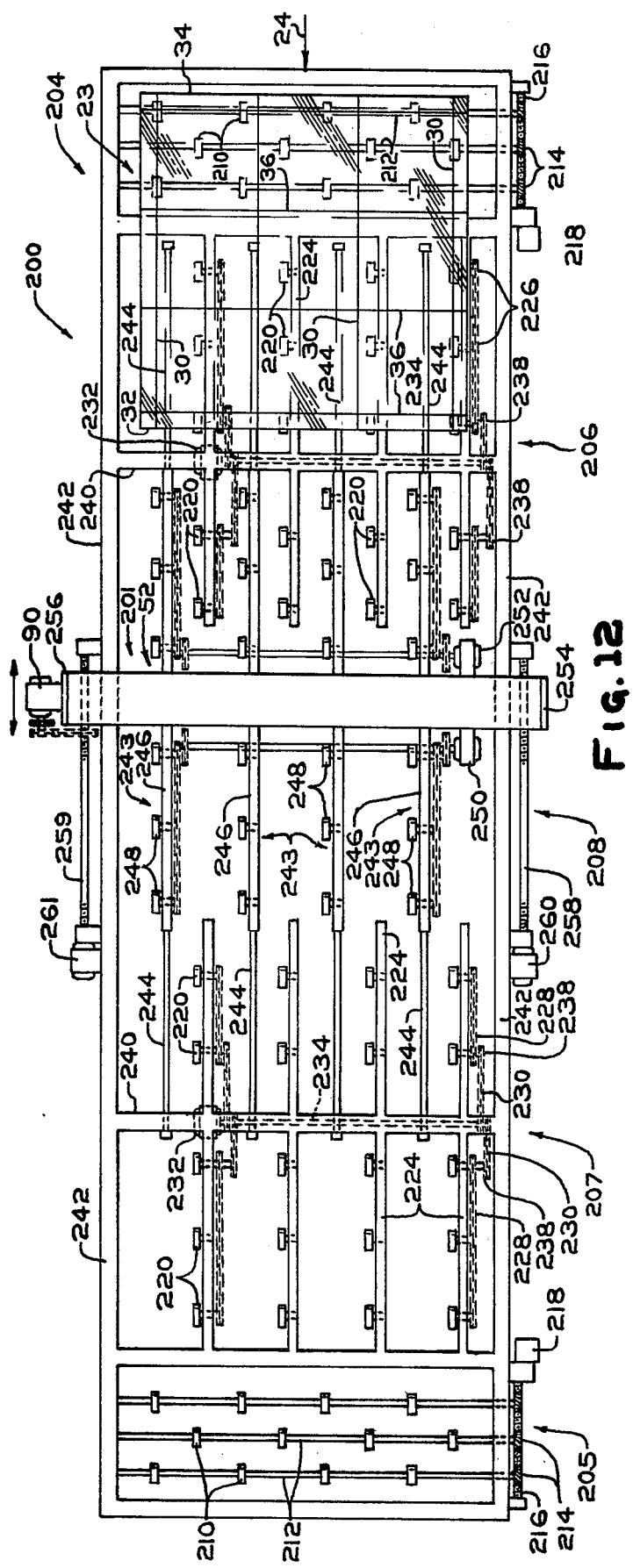
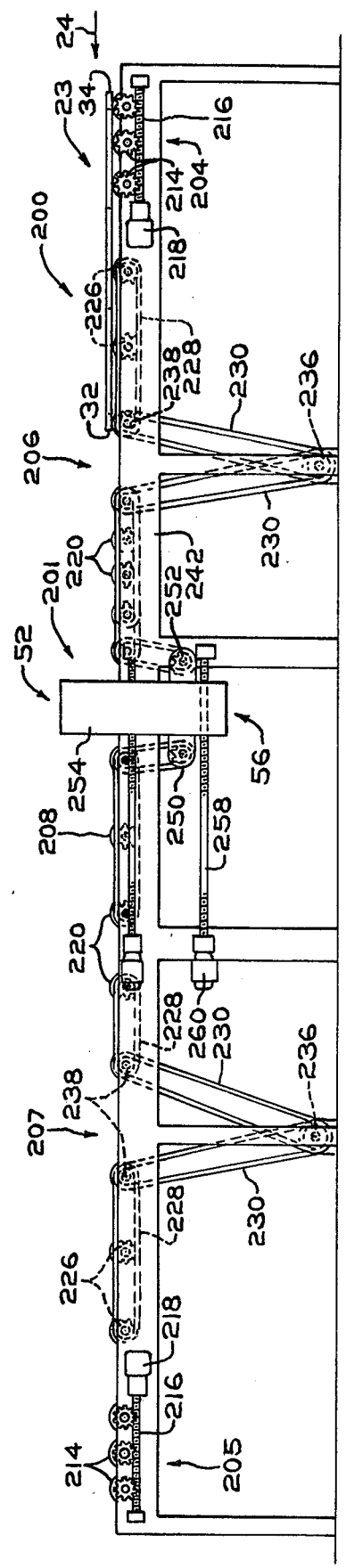
FIG. 12
FIG. 13

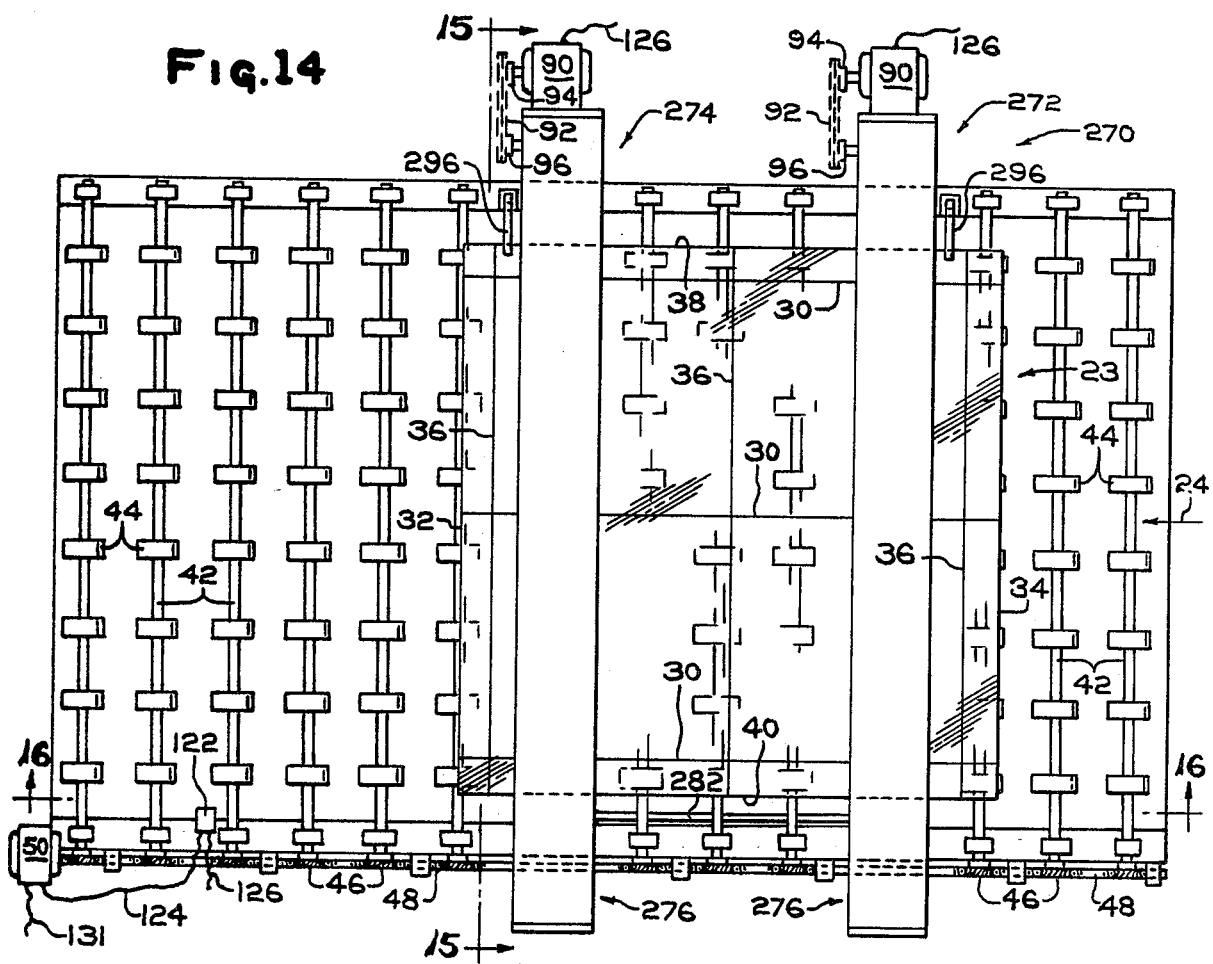
Fig. 14
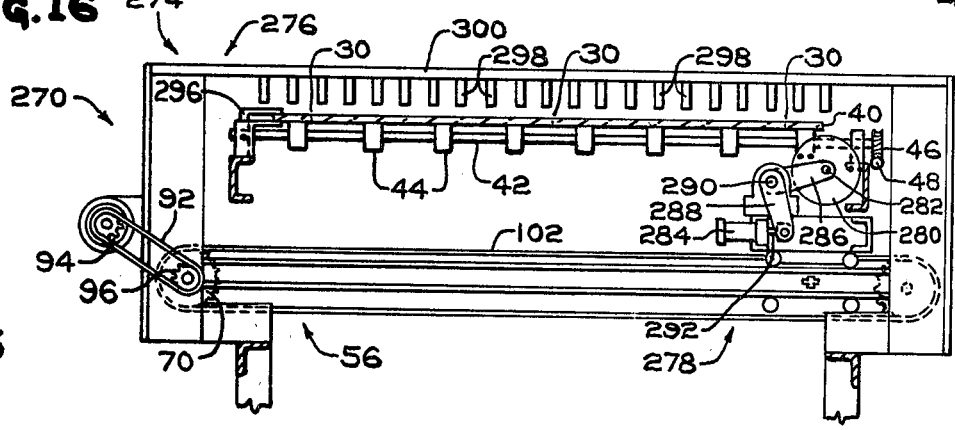
Fig. 16
Fig. 15

APPARATUS FOR OPENING SCORE LINES IN GLASS SHEETS

BACKGROUND OF THE INVENTION

1. Field of the Invention

This invention relates to a method of and apparatus for opening score lines in a fracturable material, and more particularly, to opening score lines in a glass sheet advancing along or stationary in an article movement path by displacing a bending moment across the glass sheet in a direction transverse to the score lines and the article movement path.

2. Discussion of the Prior Art

In U.S. Pat. Nos. 2,504,655; 3,259,286 and 3,592,370 there is taught the opening of score lines in a moving glass sheet. In general, score opening devices are mounted along an article movement path to apply a bending moment to a score line as the glass sheet advances past the devices.

Although opening score lines taught in the above-identified patents are acceptable, there are drawbacks. For example, a plurality of score lines on the glass have to be parallel to one another and to the article movement path. This is because the score opening devices are stationary and aligned with score lines of a given glass sheet.

If the score lines are not parallel to the glass travel path, the score line will not completely pass between the score opening device. When this occurs only a portion of the score line is opened. Further, the glass sheet has to maintain its orientation as it is conveyed past the score opening devices. If the glass sheet shifts as it advances toward the score opening devices, the score line passes along side rather than between the score opening device. As can be appreciated, providing equipment to maintain the orientation of the glass sheet with respect to the score opening devices is expensive. Still further, when the position of the score lines on the glass sheet is changed, the score opening devices have to reposition so that the score line passes between the devices.

Also taught in the prior art, e.g., in U.S. Pat. Nos. 1,997,402 and 3,181,757 is the opening of score lines on a glass sheet that are transverse to the article movement path. In general, a score opening device is mounted in the article movement path to open the score lines. The score opening device may be a pair of spaced cylindrical rolls having their axial center transverse to the article movement path or a pair of upper spaced rotatably mounted wheels and a pair of bottom spaced rotatably mounted wheels.

This prior art technique of opening score lines has limitations, one of which is versatility. More particularly, the score opening technique is not suitable for processing glass sheets having pairs of intersecting lateral and longitudinal score lines because the longitudinal score lines can open during the opening of the lateral score lines. For example, foreign particles, e.g., glass chips trapped between the scoring devices and glass sheets cooperate with the weight of the glass to apply a bending moment to the longitudinal score lines opening same.

Another limitation is the dependency on the type of conveyor used and the distance between lateral score lines. If the distance between lateral score lines is less than the distance between conveyor roller surfaces, the severed glass section will fall between the rollers. This drawback can be overcome by using a belt conveyor. However, when the glass sheet has lateral and longitudinal score lines, additional conveying equipment has to be used to reorientate the glass sections to open the longitudinal score lines.

In U.S. Pat. No. 3,268,135 there is taught another score opening device. In general, a glass sheet is advanced over conveyor rollers that are flexed upward to open longitudinal score lines to provide glass sections. The glass sections, while in the raised position, engaged skewed rollers to separate adjacent sides of the glass sections.

The drawback of the score opening technique of U.S. Pat. No. 3,268,135 is the need for precision alignment of the equipment. If the longitudinal score lines in the glass sheet are opened and the skewed wheels do not engage the glass sections, adjacent edges of the glass sections contact one another when the conveyors are flexed from the arched position to the horizontal position. When the edges of the glass sections contact one another chipping and craking of the edges result.

It would be advantageous therefore to provide a score opening device and method of opening score lines that do not have the limitation and drawbacks of the prior art.

SUMMARY OF THE INVENTION

This invention relates to a method of severing a sheet of fracturable material, e.g., fracturable plastics, glass, glass ceramics or ceramic having at least one score line. The scored sheet is advanced along an article movement path into a snapping position with the score line extending between the leading and trailing edges of the sheet. A bending moment applying facility is moved across the glass sheet in a path transverse to the article movement path to apply a bending moment to the score line to open same.

Further, this invention relates to a method of severing the sheet having a score line between a first and second opposed sides. A side of the sheet is engaged between the first and second sides as a bending moment is moved between the first and second side to open the score line. Thereafter severed sections are displaced in a direction opposite to the direction of the bending moment.

This invention also relates to an improved apparatus for severing the sheet along the score line. Conveying facilities move the sheet along an article movement path into a severing station with the score line parallel to the article movement path. Facilities for applying a bending moment are supported about the article movement path and displaced along a path transverse to the article movement path. Facilities responsive to the movement of the sheet move the bending moment applying facilities across the sheet to open the score line.

Still further, this invention relates to devices for opening a score line in the fracturable sheet.

BRIEF DESCRIPTION OF THE DRAWINGS

FIG. 1 is an elevated side view of a score opening station incorporating features of the invention;

FIG. 2 is a plan view of the score opening station of FIG. 1;

FIG. 3 is a view taken along lines 3—3 of FIG. 2;

FIG. 4 is a view taken along lines 4—4 of FIG. 3;

FIG. 5 is a view taken along lines 5—5 of FIG. 3;

FIG. 6 is a view taken along lines 6—6 of FIG. 3;

FIG. 7 is an exploded view of a score opening device of FIG. 3 opening longitudinal score lines in a glass sheet in accordance to the teachings of the invention;

FIG. 8 is a plan view of a score opening station incorporating features of the invention for opening longitudinal score lines in a moving glass sheet;

FIGS. 9, 10 and 11 are views of alternate types of score opening devices incorporating features of the invention;

FIG. 12 is a plan view of an alternate embodiment of a score opening station incorporating features of the invention for opening longitudinal score lines on a moving sheet;

FIG. 13 is an elevated side view of the score opening station of FIG. 12;

FIG. 14 is a plan view of still another embodiment of a score opening station incorporating features of the invention for opening longitudinal score lines on a stationary sheet;

FIG. 15 is a view taken along lines 15—15 of FIG. 14; and

FIG. 16 is a view taken along lines 16—16 of FIG. 14.

DESCRIPTION OF THE INVENTION

In the following discussion, like numerals refer to like elements.

With reference to FIGS. 1 and 2, there is shown a score opening station 20 including a conveyor 22 for advancing a sheet 23 of fracturable material along an article movement path indicated by the arrow designated by the numeral 24. The sheet 23 moves through a pair of score opening devices 26 and 28 incorporating features of the invention for opening longitudinal score lines 30 in the sheet 23.

The term "longitudinal score lines" as used herein is defined as a score line or fracture line in a sheet of fracturable material that is parallel to the article movement path 24. For example, as shown in FIG. 2, the longitudinal score lines 30 extend between leading edge 32 and trailing edge 34 of the sheet 23. The longitudinal score lines 30 need not be parallel to one another in the practice of the invention.

The term "lateral score line" as used herein is defined as a score line or fracture line in a sheet of fracturable material that is transverse to the longitudinal score lines 30 and the direction of the article movement path 24. For example, as shown in FIG. 2, lateral score lines 36 extend between sides 38 and 40 of the sheet 23.

In the following discussion, the sheet 23 of fracturable material is a glass sheet. However, it will become apparent that the invention is not limited thereto and that the invention may be practiced on any material that can be partially fractured along a predetermined score line or fracture line and the fracture line opened by applying a bending moment thereto. Types of material that may be used but not limited thereto are fracturable plastics, ceramic, e.g., MONOFRAX ® ceramics sold by the Carborundum Corporation, glass, and glass-ceramics, e.g., HERCUVIT ® glass-ceramic sold by PPG Industries, Inc.

The conveyor 22 may be any of the types used in the art and is not limiting to the invention. For example, the conveyor 22 may include a plurality of spaced positively driven shafts 42 each having a plurality of donut rollers 44 mounted thereon for supporting and conveying the glass sheet 23. The shafts 42 may be positively driven as shown in FIGS. 1 and 2 by providing a gear wheel 46 on an end of each of the shafts 42. The gear wheels 46 are powered by rotatably mounted worm gear 48 having an end advantageously connected to conveyor motor 50.

As will become apparent, the invention is not limited to the technique for scoring the glass sheet 23 nor to the number of longitudinal or lateral score lines 30 and 36, respectively, on the glass sheet 23. For example, but not limiting thereto, the glass sheet 23 may be scored using the scoring techniques taught in U.S. Pat. Nos. 3,795,502; 3,795,572; 3,865,293; and 3,865,673. The teachings of the above-identified patents are hereby incorporated by reference.

The score opening devices 26 and 28 are identical in construction and the discussion will be directed to the score opening device 26 with the understanding that the discussion is applicable to the score opening device 28 unless indicated otherwise.

Referring to FIG. 3, the score opening device 26 includes an upper bridge assembly 52 providing a reciprocating path for upper snapper section 54 spaced above and transverse to the article movement path 24. A lower bridge assembly 56 provides a reciprocating path for lower snapper section 58 spaced below and transverse to the article movement path 24. The bridge assemblies 52 and 56 are supported in spaced aligned relationship by a vertical structural member 60 secured (1) to the ends of the bridge assemblies 52 and 56 and (2) to side member 62 of the conveyor 22 in any conventional manner (see also FIG. 1).

As will be appreciated, the invention is not limited to the structural arrangement of the bridge assemblies 52 and 56 and other modes of maintaining the bridge assemblies 52 and 56 in spaced relation may be used.

The bridge assemblies 52 and 56 are identical in construction and the discussion will be directed to the bridge assembly 52 with the understanding that the discussion is applicable to the bridge assembly 56 unless indicated otherwise.

With reference to FIGS. 4 and 5, the bridge assembly 52 includes a pair of "C"-shaped channels 64 and 66 mounted in spaced relation in any conventional manner to provide a guideway 68 therebetween. A gear wheel 70 is rotatably mounted in one end of the guideway 68, i.e., the left end as shown in FIG. 3 and a gear wheel 72 is rotatably mounted in the other end of the guideway 68, i.e., the right end as viewed in FIG. 3.

Referring to FIG. 6, a platform 74 is movably mounted in the guideway 68 of the upper bridge assembly 52 and a platform 76 is movably mounted in the guideway 68 of the lower bridge assembly 56. The platforms 74 and 76 are identical in construction and each include an upper plate member 78 connected to a lower plate member 80 by a vertical member 82 to give the platforms 74 and 76 a general "T"-shaped cross section. The platforms are movably mounted in their respective guideway by providing wheels 84 on side portions of the upper plate member 78 engageable with upper surface of the channel members 64 and 66; wheels 86 on side portions of lower plate member 80 engageable with lower surface of the channel members 64 and 66; and side wheels 88 engageable with adjacent side portions of the channel members 64 and 66 as shown in FIG. 6.

The platforms 74 and 76 are simultaneously moved along their respective path in spaced relation to one another in any conventional manner. For example, a reversible bridge motor 90 advantageously mounted adjacent an end of the bridge assembly 52 powers endless chains 92 by way of double gear wheels 94 to rotate gear wheel 96. The gear wheel 96 is operatively connected to the gear 70 by shaft 97 as shown in FIG. 4. Energizing the bridge motor 90 rotates the gear wheel 70 of the upper and lower bridge assemblies 52 and 56 in the same rotational direction.

A chain 99 has one end secured at 100 to one side of the lower plate member 80, passes over the gear wheel 70 and the other end secured at 101 to side of the member 78 of the platform 70 of the upper snapper section 54. A chain 102, in a similar manner, has an end secured to the opposite side of the plate member 78 passes over the gear wheel 72 and has the other end secured to the opposite side of the plate member 80. The platform 76 of the lower snapper section 56 is similarly connected to its respective chains 99 and 102. In this manner, the snapper sections 56 and 54 are synchronously moved along their respective bridge members by the bridge motor 90.

With reference to FIG. 7, the upper snapper section 54 includes a pair of spaced wheels 103 and 104 rotatably mounted in housings 106 and 108, respectively. The housings 106 and 108 are slideably mounted for reciprocal vertical movement with respect to surface 110 of the member 80 of the platform 74 in any conventional manner and biased toward the article movement path 24 by way of spring 112. The lower glass snapper includes a wheel 114 rotatably mounted in housing 116. The housing 116 is mounted for reciprocal vertical movement with respect to surface 118 of the member 78 of the platform 76 in any conventional manner and biased toward the article movement path 23 by way of spring 120.

As shown in FIG. 7, the platforms 74 and 76 are in spaced relation to one another with the wheel 114 intersecting the space between wheels 103 and 104 to apply a bending moment about the longitudinal score lines 30 (one shown in FIG. 7) to open same.

The bending moment applied about the score line should be sufficient to open the score line and sever the glass sheet 23. It has been found that bending the glass on each side of the score line through a 2°-4° angle subtended by a horizontal plane and the plane of the bending glass is sufficient to open the score line.

As can be appreciated, as the glass thickness increases, the force of the bending moment should be increased for a given score depth. For example, for glass thickness of about ⅛ inch (0.32 centimeter) a bending moment force of about 1 foot pound (0.135 meter kilogram) is sufficient to open the score line and for glass thickness of about ¼ inch (0.63 centimeter) a bending moment force of about 3 foot pound (0.405 meter kilogram) is sufficient to open a score line having a depth about 25 percent of the glass thickness.

The invention is not limited to the spaced distance between the wheels 103 and 104. However as the distance decreases, the bending moment force can be decreased and vice versa due to changes in the length of the lever arm. In general, the spaced distance between adjacent peripheral surfaces of the wheels 103 and 104 is normally between about 2-8 inches (5.08-20.32 centimeters).

The diameter of the wheels 103 and 104 and 114 are not limiting to the invention. However as the diameter decreases, point contact forces are set up on the glass and may fracture the glass at locations other than the score line. Wheel diameters of about 2-8 inches (5.08-20.32 centimeters) are recommended.

In regards to the wheel 114 of the lower snapper section 58, it is further recommended that the diameter be between about 3-9 inches (7.62-22.86 centimeters). The larger diameter wheel reduces the distance that the glass drops after severing thereby avoiding contact of the severed glass edges.

The wheels 103, 104 and 114 are preferably made of a material that does not mar the glass surface but is sufficiently rigid to apply the required bending moments to open the score lines. For example, the wheels may be made of rubber, urethane or neoprene.

The invention may be practiced without biasing the wheels 103, 104 and 114 toward the glass sheet 23; however, having the wheels biased provides certain advantages. For example, as the wheels 103, 104 and 114 move over the sides 38 and/or 40 of the glass sheet 23, the wheels 103 and 104 are moved upward and the wheel 114 downward as viewed in FIG. 7 to receive the edge of the glass sheet therebetween. Also, during travel of the snapper sections 54 and 56 across the glass sheet, any variations in the spaced distance between bridge assemblies 52 and 56 is cancelled by the springs 112 and 120 urging its respective wheel toward the glass sheet 23.

For a glass sheet lying flat, a bending moment at a point on the score line subtending an angle between about 2°-4° is sufficient to open a longitudinal score line having a length of about 45 inches (1 meter). Increasing the angle, increases the length of a score line that may be opened. In our discussion, the glass sheet lies flat on the conveyor, therefore for glass sheets having a length as measured between the leading and trailing edges 32 and 34, respectively, of greater than 45 inches (1 meter) a pair of snapper sections 54 and 58 are recommended to completely open the longitudinal score lines. As can be appreciated, one upper and lower snapper section can be used by either moving the snapper sections or glass to a second position after a portion of the longitudinal score line is opened to complete the opening of the longitudinal score line.

In practice, the snapper sections 54 and 58 are in their initial position, e.g., on the left side of the coveyor 20 as viewed in FIG. 3. A glass sheet 23 having a length of greater than about 45 inches (1 meter) is moved by way of the conveyor 20 to position the glass sheet in a score opening position. For example, the leading edge 32 of the glass sheet is downsteam of the score opening device 28 and the trailing edge 34 of the sheet 23 is upstream of the score opening device 26. The lateral score lines 36 are out of the path of the snapper sections as shown in FIG. 2. This may be accomplished by providing a sensor 122 connected to the conveyor motor 50 by way of wire 124 as shown in FIGS. 1 and 2. As the leading edge 32 of the sheet 23 is sensed by the sensor 122 the conveyor motor 50 is deenergized to stop the motion of the glass sheet. The bridge motor 90 connected to the sensor 122 by wire 126 is energized to synchronously move the snappers 54 and 58 from left to right as viewed in FIG. 3 across the glass sheet 23 to open the longitudinal score lines 30-30.

When the wheels 103 and 104 of the upper snapper section 54 clear the edge 40 of the glass sheet, the section 54 energizes limit switch 128. The limit switch 128 is connected to the bridge motor 90 and to the conveyor motor 50 by way of wires 130 and 131, respectively, to (1) deenergize the bridge motor 90 and reverse its polarity and (2) energize the conveyor motor 50 to advance the severed glass sheet or glass sections out of the score opening position as a second glass sheet is advanced into the score opening position.

The above is repeated except that the snapper sections 54 and 58 are moved from right to left as viewed in FIG. 3. At the end of travel, the snapper section 54 engages limit switch 132 to stop the motion of the glass snappers, reverse the polarity of the motor 90 and energize the conveyor motor 50 as previously discussed.

As can be appreciated, the electrical system to start and stop the conveyor 22 and the snapper sections is not limiting to the invention and any type of electrical system known in the art may be used in the practice of the invention.

The instant invention may also be used to open longitudinal score lines 30 as the glass sheet 23 moves along the article path 24.

With reference to FIG. 8, it is noted that the score opening devices 26 and 28 of score opening station 133 are angled with respect to the article movement path 24. As the glass sheet 23 advances along the article movement path, the upper and lower snapper sections 54 and 58, respectively (see FIG. 7) move transverse to the article movement path 24. By (1) selectively angling the score opening devices 26 and 28 with respect to the article movement path 24; (2) moving the snapper sections at a selected speed; and (3) moving the glass sheet 23 at a selected speed, the path of the snapper sections is generally normal to the glass sheet as it moves along the article movement path 24.

For example, when the angle subtended by the score opening device and article movement path is 14°; the speed of the glass sheet is about 100 feet/minute (30 meters/minute); and the speed of the snapper sections 54 and 58 is about 1,100 feet/minute (330 meters/minute); the path of the snapper sections 54 and 58 is normal to the leading edge 32 of the moving glass sheet. As can be appreciated, the invention is not limited to the above example which is presented for illustration purposes only.

Conveyor 140 of FIG. 8 is similar to the conveyor 22 shown in FIG. 1 with the differences now to be discussed. Mounted between sides 142 and 144 of the conveyor 140 is angled guideways 146 defined by rigid members 148 and 150 for movement of the lower snapper sections 58 transverse to the article movement path 24.

Conveyor shafts 152 have an end rotatably mounted in the rigid member 148 and the other end rotatably mounted in the conveyor side member 142. Conveyor shafts 154 have an end rotatably mounted in rigid member 150 and the other end rotatably mounted in conveyor side member 144.

The shafts 152 are driven in a similar manner as shafts 42 as discussed for FIGS. 1 and 2. The shafts 154 are provided with a gear wheel 156 operatively connected to an endless chain 158 driven by gear wheel 159 mounted on adjacent shaft 42 as shown in FIG. 8.

In operation, a glass sheet is advanced by the conveyor 140 along the article movement path 24. As the leading edge of the glass sheet is sensed by detector 160, the bridge motor 90 of the score opening devices 26 and 28 is energized to move the snapper sections 54 and 58 across the glass sheet to open the score lines 30–30 as previously discussed. After the snapper sections 54 and 58 clear the glass sheet, their motion is stopped until the trailing edge of the glass sheet clears the detector 160. Thereafter the snapper sections are returned to their initial position until a glass sheet activates the detector 160 to repeat the above.

Although no electrical system is shown in FIG. 8, it can be appreciated that the electrical system described for the conveyor 22 of FIGS. 1–3 may be modified accordingly.

To prevent marring of the glass sheet by the wheels of the snapper sections as they move across the glass sheet, it is recommended that the wheels be mounted in casters to allow the wheels to freely rotate in a plane parallel to the article movement path 24.

With reference to FIG. 9, there is shown a modified snapper section 161, e.g., lower snapper section that may be used in the practice of the invention. The snapper section 161 includes the wheel 114 rotatably mounted in a corner of triangular plate 162. The plate 162 is pivotally mounted at 164 to the surface 118 of the member 78 of the platform 76 for movement toward and away from the article movement path 24 in any conventional manner. For example, a double acting cylinder 166 has end 168 pivotally mounted at 170 to the plate member 78 and its piston 172 pivotally mounted at 174 to the housing 162.

In practice, the upper and lower snapper sections 54 and 161, respectively, are simultaneously moved across the glass as previously discussed with the piston 172 extended out of the cylinder 166 to position the wheel 114 in spaced relation with the glass sheet 23. When the wheels 103 and 104 of the upper snapper section 54 are positioned about a longitudinal score line 30, the piston 172 is actuated in any conventional manner to withdraw the piston 172. As the piston 172 moves into the cylinder 166, the wheel 114 moves into engagement with the glass sheet approximately at the longitudinal score line 30 to open same as previously discussed. Thereafter, the piston 172 moves out of the cylinder 166 as the upper and lower snapper sections 54 and 161 advance across the glass sheet.

The invention is not limited to the spaced distance between the wheel 114 of the snapper 161 and adjacent glass surface. However, it is recommended that the distance be minimal for rapid engagement of the glass sheet by the wheel 114.

The advantage of snapper 161 is that the wheel 114 only contacts the glass about a score line thereby eliminating any possible marring of the glass surface.

Shown in FIGS. 10A, 10B and 10C is a snapper section 180 that may be used to apply a bending moment using only one upper and lower wheel. The lower snapper section 58 is of the type shown in FIG. 7.

The housings 106 and 108 of the wheels 103 and 104, respectively, are secured in spaced relation to a bell shaped member 182 pivotally mounted at 184 to the surface 110 of the plate member 80 of the platform 74. A double action cylinder 186 has end 188 pivotally mounted to the surface 110. Piston 190 of the cylinder 186 is pivotally mounted to the bell shaped member 182 at 192 to pivot the bell shaped member 182 about the pivot point 184 to (1) move the wheel 103 into engagement with the glass sheet while moving the wheel 104 out of engagement with the glass sheet 23, i.e., the first engaging position as shown in FIG. 10B; (2) move the wheel 103 out of engagement with the glass sheet 23 while moving the wheel 104 into engagement with the glass sheet, i.e., the second engaging position as shown in FIG. 10C; and (3) move both the wheels 103 and 104 out of engagement with the glass sheet, i.e., the initial position as shown in 10A.

In practice, the wheels 103 and 104 are in the initial position and the platforms 76 and 74 are advanced toward the glass sheet 23 as previously discussed and shown in FIG. 10A. As the wheel 103 approaches a longitudinal score line 30, the cylinder 186 is activated in any conventional manner to move the bell shaped member 182 to the first engaging position as shown in FIG. 10B. The downward bending moment force on the left side of the score line 30 is applied by the wheel 103 and the downward bending moment force on the right side of the score line as viewed in FIG. 10B is applied by the weight of the glass sheet. The upward bending moment force is applied by the wheel 114 to open the score line 30.

After the score line 30 is opened, the bell shaped member 182 moves to its initial position as the platforms 74 and 76 advance across the glass sheet to open the next score line 30. When the platforms 74 and 76 advance past the longitudinal center of the glass sheet, the scores are opened by moving the bell shaped member 182 into the second engaging position. The downward bending moment force on the right side of the score line 30 is applied by the wheel 104 and the downward bending moment force on the left side of the score line as shown in FIG. 10C is applied by the weight of the glass sheet. As before, the upward bending moment force is applied by the wheel 114.

As can be appreciated, the snapper sections 161 shown in FIG. 9 may also be used with the snapper opener 180 shown in FIG. 10 so that the glass surface is only contacted when a score line is to be opened. Further, the snapper sections 161 and 180 can be moved across the article movement path as a glass sheet is moved into the score opening position. This is particularly desirable when the snapping station 133 shown in FIG. 8 is used because the snapping is preferably started from the same side of the conveyor 140 for opening scores in moving glass sheets.

An advantage of the snapper section 180 is that the glass sections are moved apart by the action of the wheels 103 and 104. This prevents contact of the cut edges that may cause chipping.

Shown in FIG. 11 is still another embodiment of the invention using an upper rubber roller 196 in place of the upper snapper sections 54 of the score opening devices 26 and 28. The roller 196 moves along a path generally transverse to the article movement path 24 in place of the wheels 103 and 104 of the upper snapper opener 54 of the score opening devices 26 and 28.

In practice, the roller 196 applies a downward force to one side of the glass sheet as the roller 114 of the score opening sections 58 apply an upward force to the other side of the glass sheet at the score line. The bending moment results from the wheel 114 forcing the glass sheet at the score line 30 into the surface of the roller 196.

As can be appreciated, the snapper sections 161, 180 and 196 of FIGS. 9-11 can be used to open lateral score lines on the moving or stationary sheet of fracturable material.

The instant invention eliminates the problems of the score opening techniques of the prior art.

Practicing the present invention, the relationship of the longitudinal score lines is not critical because the bending moment is moved across the glass sheet transverse to the glass sheet movement path. Further, in the practice of the instant invention, the bending moment is moved across a scored glass sheet opening longitudinal score lines and eliminating any possibility of opening lateral score lines. This is because the bending moment can be applied between the lateral score lines.

Shown in FIGS. 12 and 13 is a score opening station 200 for opening longitudinal score lines 30 in a moving glass sheet by moving a score opening device 201 parallel to the article movement path 24 and the score opening devices generally normal to the article movement path 24.

Conveyor 202 of the score opening station 200 includes right and left outer stationary conveyor sections 204 and 205, respectively, right and left inner stationary conveyor sections 206 and 207, respectively, and movable conveyor section 208.

The outer conveyor sections 204 and 205 each include donut rollers 210 mounted on shafts 212. The shafts 212 are power driven by a gear wheel 214 mounted on an end of the shaft and engageable with a worm gear 216 driven by conveyor motor 218.

The inner conveyor sections 206 and 207 each include donut rollers 220 mounted on one end of a rotatably mounted shaft 222 passing through longitudinal structural member 224. A gear wheel 226 secured on the other end of the shaft 222 is driven by endless chains 228 and 230 operatively connected to conveyor motor 232 by way of motor shaft 234 and gear wheels 236 and 238.

Although the outer two rows of the donut rollers 220 are shown operatively connected to the motor 232, it is to be understood that the invention contemplates having all the donut rollers 220 operatively connected to the motor 232 in the manner discussed above.

The longitudinal structural members 224 are secured in position by lateral structural members 240 secured between sides 242 of the conveyor 202 as shown in FIG. 12. The ends of the longitudinal structural members 224 adjacent the movable conveyor section 208 extend beyond the adjacent lateral structural member 240 to receive the movable conveyor 208 in a manner to be discussed below.

The movable conveyor 208 includes a plurality of spaced longitudinal members 243 having opposed end portions 244 slideably mounted in adjacent lateral structural members 240. Intermediate section 246 of the members 243 are advantageously secured to the score opening device 201. The sections 246 are provided with donut rollers 248 driven by motors 250 and 252 mounted on the score opening device 201. The donut rollers 248 on the left side of the score opening device 201 are driven by the motor 250 and the donut rollers on the right side of the device 201 are driven by the motor 252 in like manner as the donut rollers 220 of the inner conveyor sections 206 and 207.

The score opening device 201 is similar to the score opening devices 26 or 28 except for the upper and lower bridge assemblies 52 and 56, respectively, as joined at their ends to side members 254 and 256. A worm gear 258 and 259 rotatably mounted at one end and connected at the other end to motor 260 and 261 passes through the side members 254 and 256, respectively, as shown in FIGS. 11 and 12. In this manner, the conveyor sections 208 and score opening device 201 are mounted for reciprocal movement along the article movement path 24.

In operation, the score opening device 201 is in the initial position with the end of the intermediate section 243 on the right side of the device 201 adjacent the lateral member 240 and the end of the end portion 244 of the longitudinal member 243 on the left side of the device 201 adjacent the lateral member 240 as shown in FIG. 12. A scored glass sheet 23 is moved between the bridge assemblies 52 and 56 by way of conveyor sections 204, 206 and 208.

The leading edge of the glass sheet 23 operates a sensing device (not shown) to energize the motors 260, 261 and 90 to (1) move the score opening device 201, conveyor section 208 and glass sheet to left as viewed in FIG. 12 while (2) moving the snapper sections (not shown) across the glass sheet to open the longitudinal score line 30.

Coordinating the speed of the snapper sections, score opening device 201 and conveyor section 208, the snapper sections move along a path normal to the path of the advancing sheet.

When the score opening device 201 is at its left resting position, the severed glass sheet is advanced along the conveyor sections 208, 207 and 205 out of the score opening station 200.

The score opening device 201 and intermediate conveyor section 208 are returned to their initial positions.

An advantage of the score opening station 201 shown in FIGS. 12 and 13 is that the snapper sections are considered to be moving across a stationary sheet thereby reducing marring of the glass sheet by the wheels of the snapper sections. Further, the wheels of the snapper sections need not be mounted for rotational movement in a plane parallel to the article movement path.

Referring now to FIGS. 14–16, there is shown another embodiment of a score opening station of the invention for opening the longitudinal score lines 30 in the sheet 23. The station 270 includes the conveyor 22 having the donut rolls 44 powered by the conveyor motor 50 to advance the sheet 23 into the scoring station as discussed for the scoring station 20 shown in FIGS. 1 and 2.

Scoring opening devices 272 and 274 are identical in construction and transverse the article movement path 24 as shown in FIGS. 14–16. Each of the score opening devices 272 and 274 includes a hold-down pad 276 that cooperates with lower snapper section 278 to open the longitudinal score lines in a manner discussed below.

As shown in FIG. 16, the lower snapper section 278 includes the lower bridge assembly 56 having the channels 64 and 66 to provide the guideway 68 for the platform 76 as previously discussed. The platform 76 of the score openers is preferably simultaneously moved transverse to the article movement path 24 by way of bridge motor 90 as previously discussed.

Each of the lower snappers includes a wheel 280 mounted on a common shaft 282 driven by a variable speed motor 283 to open the longitudinal score line and separate the glass sections in a manner to be discussed below.

With reference to FIG. 15, the ends of the shaft 282 are connected to a cylinder 284 by linkages 286 and 288. Ends of the linkages 286 and 288 are pivotally mounted to shaft 290. In operation, piston 292 of the cylinder 284 acts on end of the linkage 288 to rotate the shaft 290 which in turn rotates to move the linkage 286 to move the snapping wheel 280 toward and away from the article movement path. For example, when the piston is extended, the snapping wheel is moved toward the article movement path 24, i.e., into the engaging position and when the piston is retracted, the wheel is moved away from the article movement path, i.e., into the nonengaging position.

The motor 283 is operatively connected to the shaft 282 by a chain and gear assembly 294. Preferably a tensioned gear wheel (not shown) of the type used in the art is provided to maintain tension on the chain as the shaft 282 moves toward and away from the article movement path.

In practice, the sheet 23 is moved along the article movement path 24 by the conveyor 20 into the score opening position. In the score opening position, the leading edge 32 of the sheet 23 is sensed by the sensor 122 to (1) deenergize the conveyor motor 50, energize the bridge motors 90 to move the lower snapper section 278 across the article movement path (2) energize hold-down clamps 296 to engage the edge 38 of the sheet as shown in FIG. 15 and (3) energize the motor 283 to rotate the shaft 282.

As viewed in FIG. 15, the lower snapper sections 278 are moved from left to right transverse to the article movement path at a predetermined speed as the score opening wheel 282 rotates in a clockwise direction at a preselected speed.

The rotation speed of the score opening wheels 280 is selected to be greater than the transverse linear speed of the platform 76 and in a direction opposite to the direction of the platform 76 to separate the severed sections in a manner to be discussed. Further, the rotation speed is incrementally decreased as it opens each succeeding score line 30 but remains equal to or greater than the linear speed of the platform 76.

As the snapping wheel 280 approaches the first score line 30 spaced from the side 40 of the glass sheet as viewed in FIG. 15, the wheel 280 is moved into the engaging position by the piston 292. The wheel 280 urges the glass upward against fingers 298 of the snapping pad 276. The bending moment is applied by the upward force of the wheel 280 and the force of the fingers 298 of the snapping pad 276 preventing further upward movement of the glass sheet as viewed in FIG. 15.

After the score line is opened, the severed section is moved to the right as viewed in FIG. 15 by the rotation of the snapping wheel 282. The remaining portion of the glass sheet is held in position by the hold-down clamps 296. The platform 76 continues to move as the snapping wheel is moved into the non-engaging position and the rotational speed decreases.

The succeeding score lines are opened as previously discussed and the severed section moved to the right a distance less then the distance of the preceeding section.

When the snapper sections 278 are to the left of the conveyor 20 a viewed in FIG. 15, the score opening wheels 280 are in the non-engaging position and circuitry of the type used in the art and as previously discussed (1) releases the hold-down clamps 296, (2) reverses the bridge motors 90 to move the lower snapper sections to the right side of the conveyor 20 as viewed in FIG. 15 and (3) energizes the conveyor motor 50 to move the severed sections from the scoring station as another scored sheet is moved into position.

The lower snapper sections 278 as they move into the home position deenergize the conveyor motor 90 and reverses its direction. The snapping station is now ready to open the longitudinal score lines in the next sheet.

Although a complete discussion of the electrical system is not presented, any of the types used in the art may be used to practice the invention.

As can now be appreciated, the diameter of the snapper wheel 280 and its rotational speed is not limiting to the invention. However, in this regard, increasing their diameter for a constant wheel speed, increases the lateral displacement of the severed sections and vice versa.

The snapping pad 276 preferably includes a rigid member 300 having a plurality of flexible fingers 298 of sufficient strength to prevent upward movement of the sheet while permitting lateral movement of the severed section. The fingers 298 may be made of nylon.

The diameter of the fingers 298, their length and spacing are selected such that a sufficient force is applied to the glass sheet to provide the desired snapping angle while providing lateral movement of the severed section. Increasing the diameter of the fingers 298 for a given length and spacing increases the downward force and the friction acting against lateral movement of the severed glass sections. Decreasing the diameter of the fingers 298 for a given length and spacing decreases the downward force and the friction acting on the severed glass sheet. Increasing the length of the fingers for a given diameter and spacing decreases the downward force acting on the glass sheet and the friction acting on the lateral movement of the severed glass sections. Decreasing the length of the bristles for a given diameter and spacing increases the downward force acting on the glass sheet and frictional force acting against lateral movement of the severed sections. Decreasing the spacing of the fingers for a given length and diameter increases the downward force acting about the score line and the frictional force acting against lateral movement of the severed section. Increasing the spacing of the fingers for a given length and diameter decreases the downward force acting on the glass sheet and frictional force acting against the lateral movement of the severed section.

It has been found that nylon fingers having a length of ¾ inch (1.92 centimeters), a diameter of 1/32 inch (0.09 centimeter) and a spacing of 1/16 inch (0.18 centimeter) are acceptable for preventing the upward movement of the glass sheet and permitting lateral movement of the glass section without marring the surface.

The snapping pad 276 is preferably spaced about 1/16 inch (0.18 centimeter) above the glass sheet to permit the glass sheet to move under the fingers while minimizing surface marring of the glass sheets.

The advantage of the score opening stations of FIGS. 14–16 are that the glass sheet is only contacted during the opening of the scores and the severed sections are spaced from one another thereby reducing the possiblity of edge damage to the severed sections.

DETAILED DESCRIPTION OF THE INVENTION

The invention is practiced to open longitudinal score lines 30 in a glass sheet 23 having a longitudinal dimension of 120 inches (3 meters) as measured between the leading edge 32 and trailing edge 34; a lateral dimension of 60 inches (1.5 meters) as measured between sides 38 and 40 of the glass sheet 23 as shown in FIG. 2 and a thickness of ⅛ inch (0.32 centimeter).

The glass sheet 23 is scored in any conventional manner to include longitudinal score lines 30 spaced about 6 inches (15 centimeters); 2 feet (0.6 meter); 4 feet (1.2 meters); and 5½ feet (1.65 meters) from the side 40 of the glass sheet 23 and lateral score lines 36 spaced 6 inches (15 centimeters) and thereafter in 1 foot (0.3 meter) increments as measured from the leading edge 32.

With reference to FIGS. 1 and 2, score opening station 20 includes a conveyor 22 for advancing the scored glass sheet 23 along an article movement path 24. The conveyor 22 has a width as measured between its sides 62 of 8 feet (2.4 meters) and a length of approximately 20 feet (6 meters). The conveyor 22 includes shafts 42 each having a plurality of donut rollers 44. The shafts are driven by conveyor motor 50 through a gear arrangement including a worm gear 48 acting on gear wheels 46 secured on an end of each shaft 42 and operatively connected to the motor 50.

A pair of score opening devices 26 and 28 are mounted on a 45 inch (1.1 meter) center-to-center spacing. Each of the score opening devices 26 and 28 include vertical struts 60 for supporting upper bridge assembly 52 above the article movement path 24 in spaced relation to a lower bridge assembly 56. The bridge asemblies 52 and 56 are generally normal to the article movement path 24 as shown in FIG. 2. With reference to FIGS. 4 and 5, each of the bridge assemblies 52 and 56 include a pair of opposed C-shaped channels 64 and 66 advantageously held in spaced relation on the struts 60 to provide a guideway 68. A gear wheel 70 is rotatably mounted between the channels 64 and 66 at the left side of the bridge assembly (see FIG. 4) and gear wheel 72 rotatably mounted between the channels 64 and 66 (see FIG. 5) at the right side of the bridge assembly as viewed in FIG. 3.

With reference to FIGS. 4 and 6, platform 74 of the upper snapper section 52 is moved along the guideway 68 by chains 99 and 102. The chain 99 has an end secured at 101 to upper plate member 78, passes around the gear wheel 70 and has its other end secured at 100 to the lower plate member 80. The other chain 102 is similarly connected to the opposite side of the platform 74 and passes over the gear wheel 72 at the right side of the bridge assembly 52 as shown in FIG. 3.

Platform 76 of the lower glass snapper section 56 is similarly connected to a pair of chains 99 and 102.

With specific reference to FIG. 6, the platforms 74 and 76 are identical in construction and each include the upper and lower plate members 78 and 80, respectively, interconnected by vertical plate member 82. The platforms are mounted in their respective guideway 68 by wheels 84 rotatably mounted on opposed sides of the upper plate member 78 and riding on the upper surface of the channels 64 and 66; wheels 86 rotatably mounted on opposed sides of the lower plate member 80 riding on the lower surface of the channels 64 and 66; and wheels 88 rotatably mounted on the opposed sides of the vertical plate member 80.

Surface 110 of the lower member 80 of the upper platform 74 and surface 118 of the upper member 78 of the lower platform 76 are spaced about 1½ feet (0.45 meter) apart.

The platforms 74 and 76 are moved along their respective guideways in spaced relation to one another by a gear wheel and chain arrangement powered by a reversible motor 90. The motor 90 drives double gear wheels 94 to rotate gear wheels 96—96 by way of endless chain 92—92 as shown in FIG. 4. The gear wheels 96—96 are operatively connected to the gears 70—70 by way of shaft 97—97 to move the platforms 74 and 76 in spaced relation to one another in its respective guideway 68.

EXAMPLE I

With reference to FIG. 7, a pair of 3 inch (7.62 centimeters) diameter rubber wheels 103 and 104 having a durometer reading of 70 are rotatably mounted in housings 106 and 108, respectively. The housings 106 and 108 are mounted for vertical movement toward and away from the surface 110 of the lower plate member 80 of the upper platform 74 and biased away from the plate member 80 by springs 112 exerting about a 3 pound (1.4 kilogram) pressure.

In their extended position, the perimeter of the wheels 103 and 104 is 1/16 inch (0.16 centimeter) below the article movement path, i.e., the axial center of the wheels is spaced about 7 9/16 inches (0.17 meter) from the surface 110 of the lower plate member 80 of the platform 74. The wheels 103 and 104 are on a center-to-center spacing of about 6 inches (0.15 meter).

A 6 inch (0.15 meter) diameter wheel made of rubber having a durometer reading of 70 is rotatably mounted in housing 116. The housing 116 is mounted for vertical movement toward and away from the surfaces 118 of the upper plate member 78 of the lower platform 76 and biased away from the plate member 78 by a spring 120 exerting about a 3 pound (1.4 kilogram) pressure.

In its extended position, the perimeter of the wheel 114 is spaced about 1/16 inch (0.16 centimeter) above the article movement path, i.e., the axial center of the wheel 114 is spaced about 6 1/6 inches (0.15 meter) from the surface 118 of the plate members 78 of the platform 76. The axial center of the wheel 114 is horizontally spaced about 3 inches (0.075 meter) from each of the axial centers of the wheels 103 and 104.

With reference to FIGS. 1-3, the glass sheet 23 is advanced along the conveyor 20 until the leading edge 32 is sensed by detector 122 spaced about 3 feet (0.9 meter) downstream of the score opening device 28. The detector 122 through appropriate circuitry (not shown) deenergizes the conveyor motor 50 and energizes the bridge motors 90 of the score opening devices 26 and 28 to move their respective platforms 74 and 78 in a path transverse to the article movement path 24, e.g., from right to left as viewed in FIG. 3.

As the platforms 74 and 76 of the score opening devices 26 and 28 advance along their path, the wheel 103 engaging the side 40 of the glass sheet is urged upward against the biasing action of the spring 112 to exert a downward force on the glass sheet. Continued movement of the platforms moves the wheel 114 into engagement with the glass sheet side 40. The glass sheet urges the wheel downward against the biasing action of the spring 120 to exert an upward force to the glass. The wheel 104 moves over the glass and like wheel 103 exerts a downward force on the glass under the biasing action of its spring 112. A bending moment is now applied to the glass sheet as shown in FIG. 7. The bending moment as it moves across the glass sheet acts on the glass sheet such that the glass surface and a horizontal plane subtend an angle of about 3°.

As the platforms 74 and 76 advance across the glass sheets between the lateral score line 36, the longitudinal score lines 30 are opened.

When the wheel 104 clears the side 38 of the glass sheet 23, the upper platform 74 engages limit switch 132 to (1) deenergize the respective bridge motors 90 and reverse their rotational direction and (2) energize the conveyor motor 50 to advance the glass sections downstream of the score opening devices 28 while moving in a scored glass sheet.

The glass sheet advances along the article movement path until the leading edge 32 of the sheet is sensed by the detector 122. The detector deenergizes the conveyor motor 50 and energizes the bridge motors 90 to move the upper and lower snapper sections of the score opening devices 26 and 28 from left to right as viewed in FIG. 3 to open the score lines. In this instance, the wheel 104 is the leading wheel of the upper snapper sections.

When the snapper sections clear the glass sheet, limit switch 128 is engaged to (1) deenergize and reverse their respective bridge motors 90 and energize the conveyor motor 50.

The score opening station is now prepared for another scored glass sheet.

EXAMPLE II

The longitudinal score lines 30 of the glass sheet 23 are opened using the upper glass snapper 54 and lower glass snapper 160 shown in FIG. 9.

The upper glass snapper 54 is as previously discussed. The lower glass snapper 160 includes the wheel 114 rotatably mounted in triangular plate member 162. The plate member 162 is pivotally mounted at 164 to the surface 118 of upper plate member 78 of the platform 76.

The wheel 114 is moved toward and away from the article movement path 24 by a double action cylinder 166 having its piston 172 connected to the plate member 162 and the other end 168 pivotally mounted at 170 to the upper plate surface 118. Pulling the piston 172 into the cylinder 166 pivots the plate member 162 in a counterclockwise direction to move the wheel 114 toward the article movement path. Extending the piston 172 out of the cylinder 166 pivots the plate member 162 in a clockwise direction to move the wheel 114 away from the article movement path as viewed in FIG. 9.

The wheel 114 in its initial position is spaced about 1/16 inch (0.16 centimeter) below the article movement path, i.e., spaced about 1/16 inch (0.16 centimeter) from the adjacent glass surface as it lies in the article movement path.

A photodetector 198 is mounted on the surface 110 of the upper member 80 of the platform 74 to the left of the wheel 103 as shown in FIG. 9. The detector 198 is aligned with a laser 200 mounted on the surface 118 of the plate member 78 spaced about 1 foot (0.3 meter) from axis of the wheel 114 in its initial position. Similary, a photodetector and laser are mounted to the right of the wheels 104 and 114, respectively.

The glass sheet 23 is moved into the snapping position and the upper and lower snapper sections 54 and 160 are moved across the glass sheet as previously discussed for the upper and lower snapper sections in Example I.

As the glass snappers 54 and 160 advance over the side 40 of the glass sheet, the beam from the laser 200 is deflected from the detector 190 to energize a pulse counter. The glass snappers 54 and 160 are moved at a speed of 1,000 inch/minute (2,540 centimeters/inch) and for each pulse the snapper sections 54 and 160 move 1 inch (1 centimeter).

When the pulse count is 16, the center of the wheel 114 is horizontally spaced about 1 inch from the first score line adjacent the side 40 of the glass sheet 23 (see FIG. 3). The cylinder 166 is activated to pull in the piston 172 into the cylinder 166 and move the wheel a distance of about ⅛ inch (0.32 centimeter) into engagement with the glass to open the longitudinal score line.

When the pulse count is 19, the cylinder 166 is actuated to move the piston 172 out of the cylinder and move the wheel 114 away from the article movement path.

The above is repeated when the pulse count is 41 and 43 and 65 and 67 to open the longitudinal score lines in the glass sheet. When the laser 200 clears the glass sheet, the beam is incident on the detector 198 and the pulse counter stops and is reset to zero.

The glass sections are then moved from the severing station as previously discussed and a scored sheet moved into position and severed as previously discussed. In this instance, the laser and detector provided on the right side of the wheel 114 and 104, respectively, actuates the pulse counter.

EXAMPLE III

With reference to FIG. 10, the longitudinal scores 30 in the glass sheet 23 are opened using the lower snapper section 58 of FIG. 7 and upper snapper section 180. The housings 106 and 108 having the wheels 103 and 104, respectively, are mounted on bell shaped member 182. The bell shaped member 182 is pivotally mounted at 184 to the surface 110 of the plate member 80 of the platform 74.

The bell shaped member 182 is pivoted about the pivot point 184 by a cylinder 186 having an end 188 pivotally mounted to the surface 110 of the plate member 80 and a piston 190 mounted at 192 to the bell shaped member 182. In the non-engaging or initial position, the wheels 103 and 104 are spaced about 1/16 inch above the surface of the scored glass sheet. In the first engaging position, the piston 190 is extended to rotate the bell shaped member 182 in a counterclockwise direction to move the wheel 103 into engagement with the glass sheet as shown in FIG. 10B. In the second engaging position, the piston 190 is pulled into the cylinder 166 to rotate the bell shaped member 182 in a clockwise direction to move the wheel 104 into engagement with the glass as the wheel 103 is moved out of engagement with the glass sheet as shown in FIG. 10C.

The cylinder 186 may be operated in any manner, for example, in the manner discussed for the cylinder 166 of FIG. 9.

In operation, and with reference to FIG. 10, the glass snappers 180 and 58 are moved from left to right as viewed in FIG. 10 across the glass sheet 23, the wheel 114 of the snapper section 58 engages adjacent surface of the glass sheet 23 and the wheels 103 and 104 of the snapper section 180 are spaced from the glass sheet. When the pulse count is 5, the wheel 114 is horizontally spaced 1 inch from a longitudinal score line adjacent the edge 38 of the glass sheet 23. The cylinder 186 is operated to move the piston out of the cylinder to move the bell shaped member from the initial position to the first engaging position. The bending moment is applied by (1) the upward force of the wheel 114, (2) the downward force of the wheel 103 on the left side of the score line and (3) the downward force resulting from the weight of the glass sheet on the right side of the score line as viewed in FIG. 10B. When the pulse count is 7, the piston 190 moves out of the cylinder 186 to move the bell shaped member 182 to its initial position.

The above is repeated for pulse counts of 29 and 31. When the pulse count is 52, the wheel 114 is spaced 1 inch (2.54 centimeters) to the right of the third score line and the bell shaped member 182 is moved into the second engaging position to open the score line. The bending moment is applied by (1) the upward force of the wheel 114, (2) the downward force of the wheel 108 on the right side of the score line and (3) downward force resulting from the weight of the glass section on the left side of the score line 30.

When the pulse count is 54, the bell shaped member 182 is moved to its initial position. The above is repeated when the pulse count is 76 and 78.

The snapper sections 180 and 58 are stopped as previously discussed while the severed glass sheet moves out of the scoring position and a new glass sheet moves into the scoring position.

The snapper sections 180 and 58 are moved from right to left across the glass sheet 11. The bell shaped member 182 is moved from the initial position to the second position when the pulse count is 5 and 29; from the second position to the initial position when the pulse count is 7 and 31; from the initial position to the first engaging position when the pulse count is 53 and 59 and from the first engaging position to the initial position when the pulse count is 55 and 61.

The snapper sections 58 and 180 are stopped as the severed glass sheet is moved out of the snapping position and a scored glass sheet is moved into the snapping position.

EXAMPLE IV

In this example, the upper snapper section 180 of FIG. 10 is used with the lower snapper section 160 of FIG. 9. The snapper sections 180 and 160 operate as was discussed in Examples II and III.

EXAMPLE V

In this example, each of the upper glass snappers of the score devices 26 and 28 is replaced with a rotatably mounted roller 196. The roller 196 is made of rubber and has a durometer reading of 70. The diameter of the roller 196 is 3 inches (7.62 centimeters) and the legnth is 6 inches (15.3 centimeters).

The roller 196 moves across the glass sheet transverse to the article movement path with its rotating axis parallel to the article movement path 24.

The bending moment is applied to the longitudinal score line 3 by the wheel 114 of the lower snapper section 58 urging the glass sheet at the score line into the rubber roller 196.

EXAMPLE VI

The longitudinal score lines 30 on the glass sheet 23 are opened using the snapper sections 54 and 58 shown in FIG. 7 as the sheet moves along the aricle movement path.

With reference to FIG. 8, the glass snappers 26 and 28 are set at a 17° angle to the normal of the article movement path. The glass sheet is moving at a speed of 100 inches/minutes (254 centimeters/seconds) and the snapper sections at a speed of 1,100 inches/minutes (2,794 centimeters/minute).

The conveyor 140 as shown in FIG. 8 has a pair of spaced rigid members 148 and 150 to provide a path for the lower snapper section 58 and for receiving an end of the conveyor shafts 152 and 154, respectively.

The wheels 103, 104 and 114 are mounted in the housings 106, 108 and 111, respectively, for movement in a vertical plane and rotational movement in a horizontal plane in any conventional manner.

As the leading edge of the glass sheet 23 moves past detector 160, the bridge motors 90 are energized to move the snapper sections 54 and 58 from their initial position, i.e., from conveyor side 142 across the glass sheet.

The wheels of the snapper section move along a path transverse to the article movement path and normal to the longitudinal score lines 30.

The longitudinal score lines 30 are opened as previously discussed. When the snapper sections clear the glass sheet, the limit switch 126 is engaged to energize and reverse the bridge motors 90.

As the trailing edge of the glass sheet moves past the detector 157, the motor 90 is energized to move the snapper sections to their initial position. As the snapper sections move into their initial position, the limit switch 132 is engaged to deenergize and reverse the bridge motors 90. The score opening station 133 is now ready for the next sheet.

EXAMPLE VII

Longitudinal score lines 30 in the glass sheet 23 are opened using the score opening station 133 of FIG. 8 and the upper snapper section 56 and the lower snapper section 160 shown in FIG. 9.

The snapper sections 56 and 160 open the longitudinal scores as discussed in Example II.

As can be appreciated, only one laser 200 and detector 198 are used at the leading edge of the snapper sections because the snappers start from the same initial position.

EXAMPLE VIII

Longitudinal score lines 30 in the glass sheet 23 are opened using the score opening station 133 of FIG. 8 in combination with snapper sections 180 and 58 of FIG. 10 as discussed in Example III.

EXAMPLE IX

In this example, the upper snapper section 180 of FIG. 10 and lower snapper section 160 of FIG. 9 are used in combination with the score opening station 133 of FIG. 8 to open the score lines 30 of the moving glass sheet.

The upper and lower snapper sections 180 and 160 operate as was discussed in Example V and the score opening station 133 operates as discussed in Example VII with the following changes.

As the snapper sections engage the limit switch 128 (see FIG. 3) the bridge motors 90 are deenergized, reversed and energized to move the snapper sections to the initial position as the glass sheet is conveyed from the score opening station.

The snapper sections as they move into their initial position engage the limit switch 132 (see FIG. 3) to deenergize and reverse the bridge motor 90.

EXAMPLE X

In this example, the longitudinal score lines of the glass sheet 23 are opened using the score opening station 270 shown in FIGS. 14–16.

The score opening station includes the conveyor 20 of FIGS. 1 and 2 having a pair of score opening devices 272 and 274 mounted normal to the article movement path 24 and on a center-to-center spacing of about 45 inches (1 meter).

Each of the score opening devices 272 and 274 includes a 3 inch (7.62 centimeters) wide snapping pad 276 secured at its ends to structural members 302 and 304. The pads 276 include a rigid member 300 having a plurality of nylon fingers 298 having a diameter of 1/32 inch (0.09 centimeter); a length of ¾ inch (1.92 centimeter) and a center-to-center spacing of 1/16 inch (0.18 centimeter).

The fingers are spaced about ⅛ inch (0.32 centimeter) above the surface of the glass sheet 23.

Each of the score opening devices 272 and 274 further include the lower bridge assembly 56 and the platform 76 powered as previously discussed to move along a reciprocating path transverse to the article movement path and spaced from the hold-down pad 276.

The platform 76 is part of the lower snapper section 278 of the score opening devices 272 and 274. Each of the snapper sections 278 further include a rubber wheel 280 having a durometer of about 90, a diameter of about 9 inches (22.7 centimeters) and a thickness of about ½ inch (1.27 centimeters).

The wheels 280 are mounted on a common shaft 282 secured at its end to linkage 286. The other end of linkage 286 and end of linkage 288 are secured to rotatably mounted shaft 290. The other end of the linkage 288 is pivotally connected to piston 292 of the cylinder 284. Extending the piston 292 moves the wheels 280 toward the article movement path and retracting the piston moves the wheels 280 away from the article movement path.

A pair of calipher hold-down devices 296 are mounted on the left side of the conveyor 20 as viewed in FIG. 15.

The glass sheet advances along the conveyor until the leading edge of the sheet energizes sensor 126. At this time, the conveyor motor 50 is deenergized to stop the advancement of the sheet 23 and energize the bridge motors 90 to move the lower snapper section from right to left as viewed in FIG. 15. Further the sensor 122 in any conventional manner energized the hold-down devices 296 to engage side 38 of the sheet 23 and energize the motor 283 of the lower snapper sections to rotate the wheels 280 in a clockwise direction as viewed in FIG. 15.

The speed of the lower snapper sections is 7 inches/seconds (17.6 centimeters/second) and the rotational speed of the wheels 280 is 8 inches/seconds (20.1 centimeters/second).

At the first longitudinal score line 30 spaced from the side 40 of the sheet 23, the piston 292 is extended to move the wheel 280 upward against the longitudinal score line.

A bending moment is applied to the longitudinal score line by the upward force of the wheel 280 and the hold-down force of the snapping pad 276. The glass sheet is severed along the score line and laterally moved to the right as viewed in FIG. 15 a distance of about ¼ inch (0.64 centimeter) by the rotation of the wheels 280. The remaining portion of the sheet is held in position by the device 296.

As the lower snapping sections 278 advance along their path, the piston is retracted to lower the wheels 280 and the rotational speed of the wheels is reduced to about 7¼ inch/second (19.5 centimeter/second) in any conventional manner.

At the second longitudinal score line from the side 40 of the glass sheet 23, the wheels 280 are again urged upward against the glass sheet to sever the score line and laterally displace the severed section ⅛ inch (0.32 centimeter) to the right as viewed in FIG. 15.

As before, the wheels 280 are moved to the nonengaging position. The speed of the motor is reduced to about 7½ inches (18.9 centimeters).

The above is repeated for each of the subsequent score lines and the speed of the motor 283 reduced to laterally displace the severed section ½ the previous distance.

After the longitudinal score lines are opened, the motor 90 is reversed to move the lower snapper sections 278 to the right of the conveyor as viewed in FIG. 15, the hold-down clamps 296 are disengaged and the conveyor motor 50 energized to move the severed sections out of the score opening position as another scored sheet is advanced toward the score opening position.

When the lower snapping section moves into the home position at the right side of the conveyor as viewed in FIG. 15, the bridge motor 90 and motor 283 are deenergized.

The score opening station 270 is ready to open the longitudinal score lines of the advancing sheet.

As can be appreciated, the invention is not limited to the above examples which were presented for purposes of illustrating the inventions. For example, the conveyor donut rollers may be replaced with cylindrical rollers. The cylindrical rollers are preferred for narrow severed sections.

What is claimed is:

1. An apparatus for severing a sheet of a fracturable material, the sheet having at least one score line extending between a first and a second opposite edge which edges are transverse to a direction of advance, comprising:
    means for advancing the sheet to be severed along an article movement path into a severing station;
    means for applying a bending moment;
    means mounting said applying means at the severing station for displacing said applying means along a path transverse to the article movement path and extending from one side of the article movement path to the opposite side; and
    means responsive to the movement of the sheet to be severed into the severing station and acting on said displacing means to displace said applying means from one side of the article movement path to the opposite side.

2. The apparatus as set forth in claim 1 wherein the fracturable material is selected from the group consisting of plastics, glasses, glass-ceramics and ceramics.

3. An apparatus for severing a sheet of a fracturable material, the sheet having at least one score line extending between a first and a second opposite edge which edges are transverse to a direction of advance, comprising:
    means for advancing the sheet to be severed along an article movement path into a severing station;
    a rotatably mounted wheel biased toward one side of the article movement path;
    a pair of spaced rotatably mounted wheels each biased toward the opposite side of the article movement path;
    means mounting said wheel and said pair of wheels for synchronously moving said wheel and said pair of wheels along a path transverse to the article movement path with said wheel spaced from the spaced distance between said pair of wheels; and
    means responsive to the movement of the sheet to be severed and acting on said moving means for displacing said wheel and said pair of wheels along their respective path.

4. The improved apparatus as set forth in claim 3 further including:
    first means for moving (1) a first one of said pair of wheels away from the article movement path as the second one of said pair of wheels is moved toward the article movement path, (2) the second one of said pair of wheels away from the article movement path as the first one of said pair of wheels is moved toward the article movement path, and (3) each of said pair of wheels away from the article movement path; and
    said responsive means further including means responsive to movement of said pair of wheels transverse to the article movement path and acting on said first moving means to move (1) the first one of said pair of wheels toward the article movement path, (2) to move the second one of said pair of wheels toward the article movement path; or (3) both of said wheels away from the article movement path at preselected positions along their path.

5. The improved apparatus as set forth in claim 4 further including:
    second means for moving said wheel toward and away from the article movement path; and
    said responsive means further including means responsive to movement of said wheel and acting on said second moving means to move said wheel toward and away from the article movement path at preselected positions along its path of travel.

6. The improved apparatus as set forth in claim 3 further including:
    means for moving said wheel toward and away from the article movement path; and
    said responsive means further including means responsive to movement of said wheel and acting on said wheel moving means to move said wheel toward and away from the article movement path at predetermined positions along its path of travel.

7. An apparatus for severing a sheet of a fracturable material, the sheet having at least one score line extending between a first and a second opposite edge which edges are transverse to a direction of advance, comprising:
    means for advancing the sheet to be severed along an article movement path into a severing station;
    means for applying a bending moment;
    a first bridge means mounted on one side of the article movement path spaced from and transverse to the article movement path;
    a second bridge means mounted on the other side of the article movement path and aligned with said first bridge means;
    said first and second bridge means supporting said bending moment applying means;
    means for displacing said bending moment applying means on said first and second bridge means along a path transverse to the article movement path; and
    means responsive to the movement of the sheet to be severed and acting on said displacing means to displace said bending moment applying means along its path.

8. The improved apparatus as set forth in claim 7 wherein said responsive means includes:
    detector means for sensing the sheet as it advances into the severing station; and
    means responsive to said detector means and operatively connected to said advancing means and said supporting and displacing means for stopping the sheet at the severing station and moving said means for applying a bending moment from a first position to a second position across the article movement path.

9. The improved apparatus as set forth in claim 8 further including:
means responsive to said means for applying a bending moment as it moves into the second position and operatively connected to said advancing means and said supporting and displacing means for stopping the motion of said means for applying a bending moment and energizing said advancing means.

10. The improved apparatus as set forth in claim 7 wherein said supporting and displacing means further includes:
means mounting said first and second bridge means for moving said first and second bridge means along a path parallel to the article movement path as said means for applying a bending moment is moved transverse to the article movement path.

11. The improved apparatus as set forth in claim 10 wherein said advancing means includes a first and second stationary conveyor section and a third conveying section reciprocably movable between the first and second conveyor sections and said responsive means includes:
detector means for sensing the sheet as it moves into the severing station;
first means responsive to said detector means and operating on said third conveyor section and said supporting and displacing means to move said first and second bridge means and said third conveyor section from a first position to a second position along the article movement path while moving said means for applying a bending moment from a first position to a second position across the article movement path; and
second means responsive to said means for applying a bending moment moving into the second position and acting on said third conveyor section and said first and second bridge means to stop the movement of said means for applying a bending moment while moving said first and second bridge means and said third conveyor section from their respective second position to their respective first position.

12. An apparatus for severing a sheet of a fracturable material, the sheet having at least one score line extending between a first and a second opposite edge which edges are transverse to a direction of advance, comprising:
means for advancing the sheet to be severed along an article movement path into a severing station;
means for applying a bending moment;
first bridge means mounted on one side of the article movement path spaced from and at an angle to the article movement path;
second bridge means mounted on the other side of the article movement path spaced from and aligned with said first bridge means;
said first and second bridge means supporting said bending moment applying means;
means for displacing said bending moment applying means on said first and second bridge means along a path transverse to the article movement path; and
means responsive to the movement of the sheet to be severed and acting on said displacing means to displace said bending moment applying means along its path.

13. A device for severing scored fracturable material, comprising:
a plurality of flexible fingers;
a wheel;
means for moving said wheel toward and away from said plurality of flexible fingers;
means for moving said wheel along a path spaced from said plurality of flexible fingers; and
means for rotating said wheel at successive decreasing speeds as it moves along its path.

14. An apparatus for severing a sheet of fracturable material having at least one score line, comprising:
means for advancing the sheet to be severed along an article movement path;
a plurality of flexible fingers mounted on one side of the article movement path;
means mounted on the other side of the article movement path for urging the sheet to be severed toward said flexible fingers to apply a bending moment force about the at least one score line to sever the sheet along the at least one score line.

15. The apparatus as set forth in claim 14 wherein said urging means includes:
a rotatably mounted wheel; and
means for moving said wheel along a path spaced from said plurality of flexible fingers.

16. The apparatus as set forth in claim 15 further including:
means for rotating said wheel in a direction opposite to the direction of movement of said wheel along its path.

17. The apparatus as set forth in claim 16 further including means for varying the rotational speed of said wheel as it moves along its path.

18. The apparatus as set forth in claim 14 wherein the fracturable material is selected from the group consisting of plastics, glasses, glass-ceramics and ceramics.

19. The apparatus as set forth in claim 14 wherein the sheet has the at least one score line extending between a first and a second opposite edge and said advancing means advances the first edge of the sheet to be severed into the severing station, said plurality of flexible fingers are mounted transverse to the article movement path and said urging means includes a rotatably mounted wheel and means for moving the wheel along a path transverse to the article movement path.

20. The apparatus as set forth in claim 19 wherein said urging means further includes:
means mounting said wheel for moving said wheel toward and away from said plurality of flexible fingers; and
means responsive to the movement of said wheel along its path for acting on said movement means to move said wheel toward and away from said plurality of flexible fingers at preselected positions along its path.

* * * * *